(12) United States Patent
Wilson

(10) Patent No.: US 8,226,021 B2
(45) Date of Patent: Jul. 24, 2012

(54) FOOD BLENDER SUBASSEMBLY AND METHOD

(76) Inventor: Ian Geoffrey Wilson, Cheltenham (AU)

( * ) Notice: Subject to any disclaimer, the term of this patent is extended or adjusted under 35 U.S.C. 154(b) by 223 days.

(21) Appl. No.: 12/666,580

(22) PCT Filed: Jun. 27, 2008

(86) PCT No.: PCT/AU2008/000935
§ 371 (c)(1),
(2), (4) Date: Dec. 23, 2009

(87) PCT Pub. No.: WO2009/000042
PCT Pub. Date: Dec. 31, 2008

(65) Prior Publication Data
US 2011/0248111 A1    Oct. 13, 2011

(30) Foreign Application Priority Data

Jun. 27, 2007  (AU) ............................... 2007903474

(51) Int. Cl.
B02C 25/00  (2006.01)
(52) U.S. Cl. ...................................... 241/92; 241/282.2
(58) Field of Classification Search ............... 241/282.1, 241/282.2, 278.1, 92
See application file for complete search history.

(56) References Cited

U.S. PATENT DOCUMENTS

| | | | | |
|---|---|---|---|---|
| 2,304,476 A | * | 12/1942 | Poplawski | ................. 241/282.2 |
| 3,344,829 A |   | 10/1967 | Ripple | |
| 3,881,705 A | * | 5/1975 | Greenspan | ................. 241/282.2 |
| 5,018,675 A | * | 5/1991 | Gateaud | ..................... 241/282.2 |
| 6,715,706 B1 | * | 4/2004 | Planca et al. | ..................... 241/36 |
| 7,600,706 B2 | * | 10/2009 | Huang | ......................... 241/37.5 |
| 2011/0240782 A1 | * | 10/2011 | Sands | ....................... 241/282.2 |

FOREIGN PATENT DOCUMENTS

| | | |
|---|---|---|
| AU | 199953839 B2 | 9/1999 |
| CA | 2343976 A1 | 3/2000 |
| CN | 1316886 A | 10/2001 |
| CZ | 20010845 A3 | 12/2001 |
| EP | 1112013 A1 | 7/2001 |
| GB | 1155395 | 6/1969 |
| HK | 1040483 A1 | 11/2005 |
| IL | 141432 A | 5/2005 |
| JP | 2007275503 A | 10/2007 |
| NZ | 510995 A | 5/2003 |
| PL | 346533 A1 | 2/2002 |
| SK | 3182001 A3 | 1/2002 |
| WO | 0013563 | 3/2000 |

OTHER PUBLICATIONS

International Preliminary Report on Patentability for International Patent Application No. PCT/AU2008/000935.
International Search Report for International Patent Application No. PCT/AU2008/000935.

* cited by examiner

*Primary Examiner* — Faye Francis
(74) *Attorney, Agent, or Firm* — Stetina Brunda Garred & Brucker; Lowell Anderson

(57) ABSTRACT

A food blender subassembly; said subassembly comprising a blade assembly securing element for securing a blade assembly in the base of a blender jug; said blade assembly securing element including an internally threaded cylindrical upper portion and a downwardly extending rim; at least portions of an underside of said downwardly extending rim provided with resilient high-friction material.

10 Claims, 3 Drawing Sheets

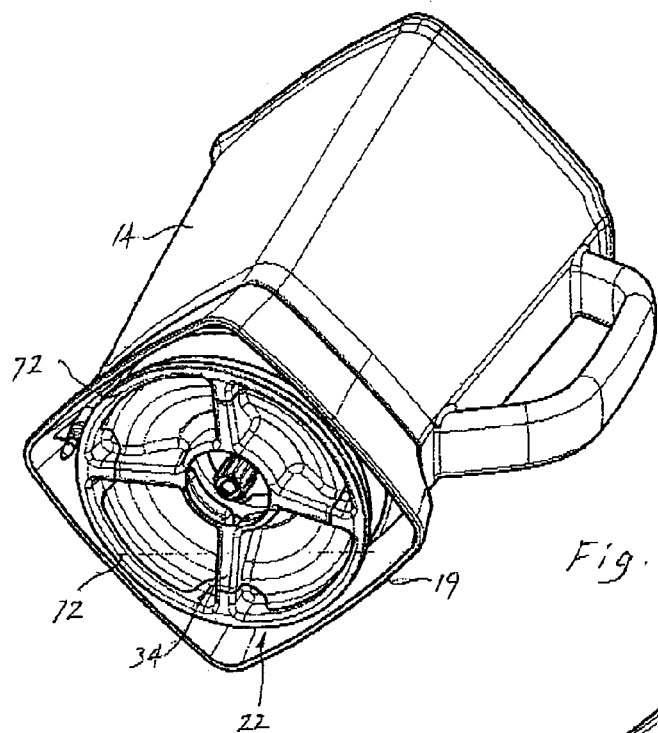
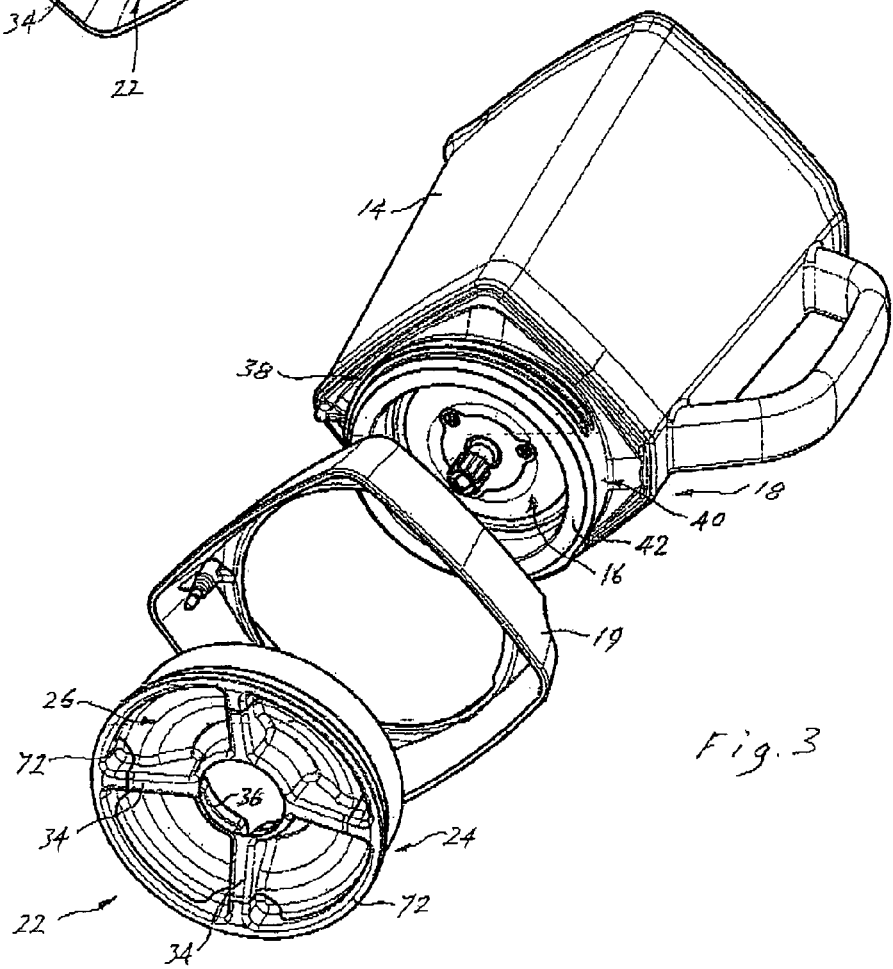

FOOD BLENDER SUBASSEMBLY AND METHOD

The present invention relates to food blenders and, more particularly, to arrangements of interconnection of components and methods of assembly and disassembly of such blenders.

BACKGROUND

Food blenders for domestic and commercial kitchen use typically comprise of a number of components which may be disassembled for cleaning purposes but also for servicing and the replacement of worn or damaged parts.

Typically, the main components of a food blender are a base module which houses the driving motor, its control circuitry and operator controls; a glass or at least transparent blender jug, and a blade assembly secured in the base of the jug. Some blenders at least include a transition skirt which covers the junction between the base module and the blender jug.

Again typically, the lower end of the blade shaft is splined and mates with an internally splined output shaft of the drive motor located in the base module. One or more projecting elements from the base module engage with the jug (or a skirt depending from the jug) to prevent rotation of the jug relative the base module. A safety interlock is usually also provided to prevent operation of the drive motor when the jug and blade assembly is not correctly located on the base module.

The majority of both commercial and domestic blenders have removable blade assemblies. These are removable primarily to facilitate cleaning, but also because blade assemblies do not always last as long as the blender jugs and may require replacement. The latter is especially true with glass blender jugs, which normally last longer than plastic blender jugs and can easily outlast the blending blades.

Most known removable blade assemblies are clamped to the bottom of the blender jug by means of some sort of bayonet fitting or threaded nut or member which, together with a sealing washer, secures the assembly to the blender jug. This basic system has proven to be very successful as it allows for several tolerance variations in both blade assemblies and blender jugs.

Frequently however, these locking nuts or members prove very difficult to remove by hand. In many cases they are recessed within a skirt projecting below the blender jug, so that limited purchase may be available for the hand of a user. Frequently, if not removed immediately after use, a securing nut or member is liable to seize in position.

As one solution to this problem, several manufacturers supply separate tools specifically for the undoing of these securing elements. One problem with this approach is that such separate tools are likely to be misplaced and, where the securing system has been designed to rely on such tools, a user may be left with a dirty or unserviceable blender.

Another problem with known blender assemblies is that the transition skirt is permanently attached to the blender jug. In one know arrangement, the blade assembly is locked into the skirt, for example by a bayonet connection, rather than being assembled directly to the jug. A disadvantage is that food particles and other grime can become lodged between the adjoining surfaces of jug and skirt, forming an unsightly and unhygienic ring.

It is an object of the present invention to address or at least ameliorate some of the above disadvantages.

Note
1. The term "comprising" (and grammatical variations thereof) is used in this specification in the inclusive sense of "having" or "including", and not in the exclusive sense of "consisting only of".
2. The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in a first broad form of the invention, there is provided a food blender subassembly; said subassembly comprising a blade assembly securing element for securing a blade assembly in the base of a blender jug; said blade assembly securing element including an internally threaded cylindrical upper portion and a downwardly extending rim; at least portions of an underside of said downwardly extending rim provided with resilient high-friction material.

Preferably, said resilient high-friction material comprises at least three pads of said material spaced around said underside of said downwardly extending rim.

Preferably, said resilient high-friction material comprises an annular ring of said material.

Preferably, said annular ring is a U-shaped annular ring.

Preferably, said internally threaded upper cylindrical portion is adapted for threaded engagement with an external thread at a base portion of said blender jug.

Preferably, an outwardly extending flange of a said blade assembly is secured between a flat annular surface of said base portion of said blender jug and an upper surface of an inwardly extending flange portion of said blade assembly securing element.

Preferably, a transition skirt extends between a lower portion of said blender jug and a base module of said food blender; said transition skirt retained in contact with said blender jug by said blade assembly securing element.

Preferably, the underside of said resilient high-friction material projects below the underside of said transition skirt.

Preferably, said resilient high-friction material is provided with a textured underside; said textured underside arranged to maximise friction between said annular ring and a contacting surface.

Preferably, said textured underside is biased so as to provide greater resistance to rotation in a first direction compared with resistance to rotation in a second opposite direction, when torque is applied to said blade assembly securing element and said textured underside is in contact with a said supporting surface.

Preferably, said rotation in said first direction is that direction in which said blender jug must be rotated contra said blade assembly securing element to disengage said threaded engagement between said blender jug and said blade assembly securing element.

Preferably, said resilient high-friction material provides support for said blender jug and blade assembly when said blender jug and blade assembly are removed from said base module of said blender and placed upright on said supporting surface.

Preferably, said annular ring of resilient high friction material provides a noise suppressing seal between the assembly of said blender jug and blade assembly, and said base module when said blender is assembled and in use.

Preferably, said transition skirt is automatically disengaged from said blender jug when said blade assembly securing element is removed from said subassembly.

In another broad form of the invention, there is provided a method of removing a blade assembly of a food blender from the base of a blender jug; said method including;
(a) removing said blender jug and blade assembly from a base module of said blender,
(b) placing said blender jug and blade assembly upright on a supporting surface,
(c) grasping said blender jug,
(d) rotating said blender jug while applying downward pressure so as to loosen threaded engagement between a blade assembly securing element and a base of said blender jug,
(e) removing said blade assembly securing element from said base of said blender jug,
(f) removing said blade assembly from said blender jug.

Preferably, said blade assembly securing element comprises an internally threaded cylindrical portion and a downwardly extending lower rim of said cylindrical portion.

Preferably, said lower rim is provided at an underside with an annular ring of resilient high-friction material.

Preferably, said annular ring of resilient and high-friction material is provided with tread-like structures at an underside of said annular ring.

Preferably, said tread-like structures are arranged so as to provide a greater coefficient of friction against a said supporting surface when a torque is applied to said blade assembly securing element in a first rotation direction compared with the coefficient of friction when a torque is applied in a second opposite direction of rotation.

BRIEF DESCRIPTION OF DRAWINGS

Embodiments of the present invention will now be described with reference to the accompanying drawings wherein:

FIG. 2 is a perspective view from below of the jug and blade assembly of the food blender of FIG. 1, FIG. 3 is an exploded view of the assembly of FIG. 2.

DETAILED DESCRIPTION OF PREFERRED EMBODIMENTS

Figures 1, 1A:
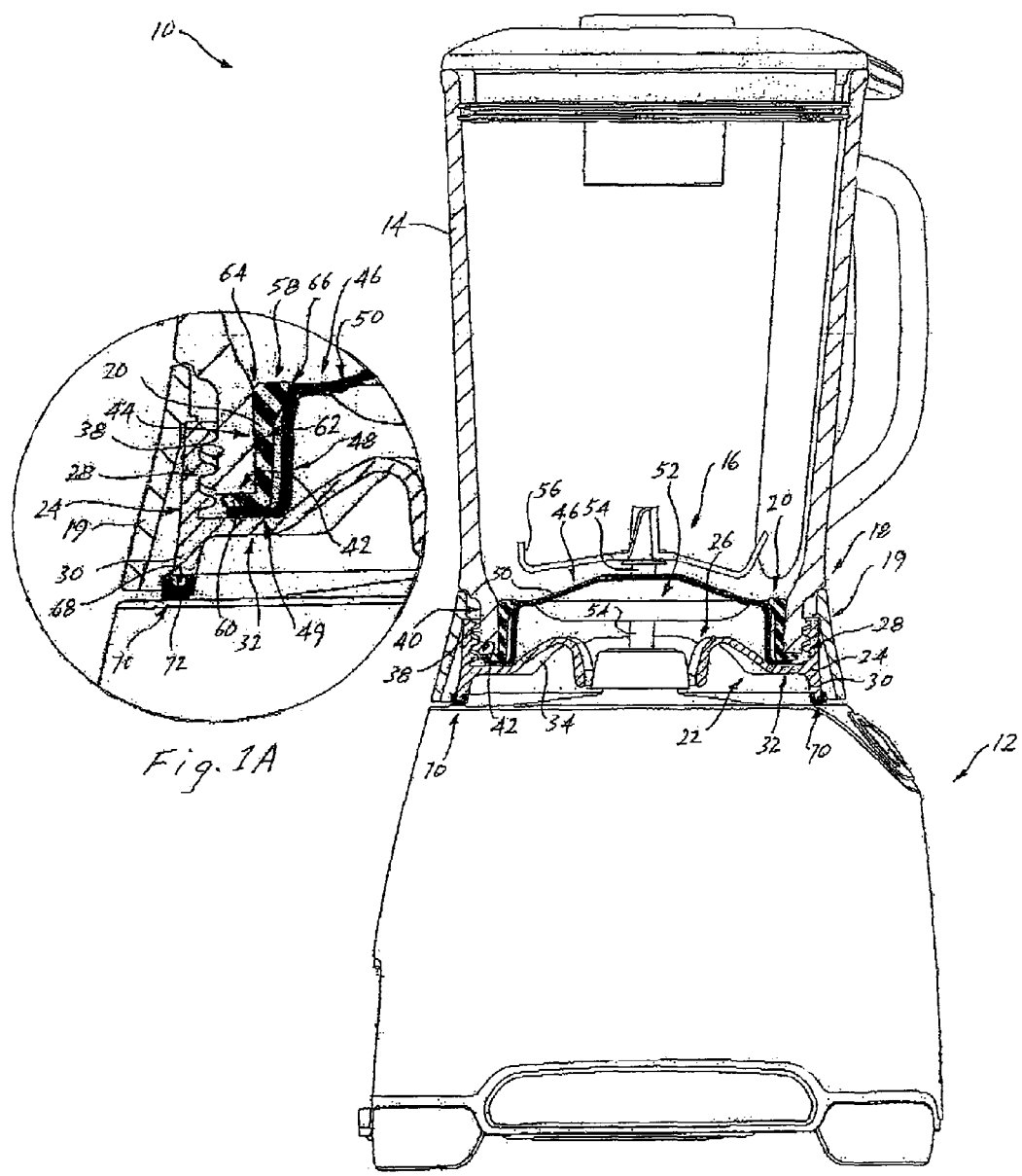
FIG. 1 is a partly sectioned elevation view of a food blender incorporating a [referred embodiment of the subassembly components of the present invention.
FIG. 1A is an enlarged portion of the food blender of FIG. 1 showing details of the subassembly.

With reference to FIG. 1, a food blender 10 comprises a base module 12 housing the drive motor and control components, a glass blender jug 14 and a blade assembly 16 situated in the base 18 of blender jug 14. A transition skirt 19 is located around the junction between the base module 12 and the blender jug 14.

The blade assembly 16 is releasably sealed and secured in the base 18 of blender jug 14, by means of an annular seal 20 and a blade assembly securing element 22. Blade assembly securing element 22 includes an outer ring 24 with a central webbed structure 26. Outer ring 24 includes an upper internally threaded portion 28 and a lower projecting rim portion 30. Central webbed structure 26, as best seen in FIGS. 1 and 1A, includes an inwardly extending horizontal flange 32 with an array of webs 34 (best seen in FIGS. 2 and 3) linking horizontal flange 32 with inner ring structure 36.

Again with reference to FIGS. 1 to 3, the present invention provides for a subassembly arrangement and method for conveniently disassembling the blade assembly 16 from the base 18 of the blender jug 14, in particular a glass blender jug. In this instance, the glass blender jug 14 is provided with an external thread 3B at a lower cylindrical portion 40 of the jug and adapted to engage with the thread of the upper internally threaded portion 28 of outer ring 24. The underside of the cylindrical portion 40 comprises a flat annular surface 42 with the inner surface 44 of the cylindrical portion having a draft for manufacturing purposes.

With reference also to FIG. 1A, the blade assembly structure 46 comprises a cylindrical skirt 48, with an integral closure 50 at the top, so that when inserted into the cylindrical portion 40 of the blender jug 14, the upper surface of the closure 50 forms the inside bottom of the blender jug. A seal and bearing structure 52 is supported in the centre of the closure 50 which in turn supports drive shaft 54 and blades 56. An outwardly extending flange integral with, and located at the lower rim of the cylindrical skirt 48 locates below the flat annular surface 42 of the underside of the lower cylindrical portion 40 of blender jug 12.

With reference again to FIGS. 1 and 1A, annular sealing element 20 comprises an upper sealing ring 58 and lower sealing ring 60 interconnected by a cylindrical joining element 62. Upper sealing ring 58 provides a seal between the upper edge 64 of inner surface of the lower cylindrical portion 40 of the blender jug and the upper edge 66 of the cylindrical skirt 48 of the blade assembly structure 46. The lower sealing ring 60 is compressed between the outwardly extending flange 49 of the blade assembly structure 46, and the flat annular surface 42 of the lower cylindrical portion 40 of the blender jug, when blade assembly securing element 22 is fully screwed onto the blender jug 14.

Over-moulded, or otherwise affixed to the lower rim 68 of the outer ring 24 of the blade assembly securing element 22, is one or more friction elements 70. In at least one form, friction element 70 may comprise a number of pads or U-shaped segments, arranged at intervals around lower rim 68, but more preferably friction element 70 comprises a generally U-shaped ring 72.

As can most clearly be seen in FIG. 1A, when the upper blender assembly, comprising the blender jug 14, transition skirt 19 and secured blade assembly 16, is positioned on the base module 12 for use, the upper blender assembly is supported on the base module by the friction element/s 70.

Figure 4:
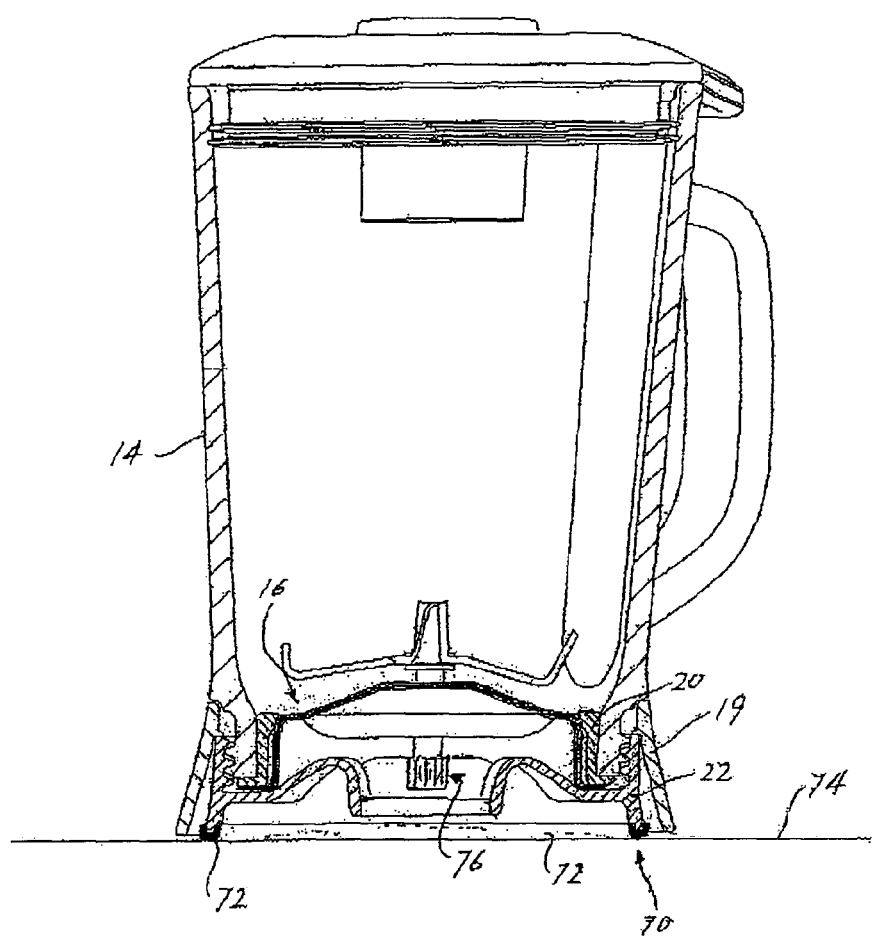
FIG. 4 shows the upper assembly of the food blender of FIGS. 1 to 3 resting on a supporting surface.

The configuration of the blade assembly securing element 22 is such that the level defined by the underside of the friction element 70 (or U-shaped ring 72) is situated below the underside of the transition skirt 19. Thus when the upper assembly of the jug 14, the attached transition skirt 19 and blade assembly 16 are lifted off the base module 12, the assembly may be placed upright on a supporting surface 74, to rest on the friction element 70 (or U-shaped ring 72) as shown in FIG. 4. Disassembly of the blade assembly 16 from the blender jug 14 may then be effected by grasping the jug and, while applying some downward pressure, rotating the jug relative to the blade assembly securing element 22. The friction element 70 then provides sufficient resistance to rotation against the supporting surface 74, for the blade assembly securing element 22 to be easily disengaged from the external thread 38 of the jug. Once loosened, further rotation of the blade assembly securing element 22 may be effected by means of grasping the internal webs 34. With the blade assembly securing element 22 removed, the blade assembly 16 and seal 20 can be readily withdrawn from the base of the jug for cleaning or servicing.

Friction element 70 (or ring 72) is formed of a resilient, high-friction material. In preferred forms of the friction element, the underside may be provided with grip maximising textures (not shown). In particular such textures or tread-like structures, can be biased so as to provide a greater coefficient of friction and thus resistance to rotation, in a first unscrewing direction compared with the coefficient of friction and resistance to rotation in the second opposite screwing-on direction. By this means over-tightening of blade assembly securing element 22 can be avoided.

As well as providing a novel and effective way of releasing a blade assembly from a blender jug, when in the form of the continuous U-shaped ring 72, the friction element 70 in effect forms a noise-suppressing seal for the noise generated by the interaction of the blade shaft spline 76 and motor output shaft spline (not shown).

A secondary function of blade assembly securing element 22, is the retention of the transition skirt 19 (as described above) which in a preferred embodiment of the invention is provided as a separate component of the food blender assembly. In the present preferred embodiment, skirt 19 is provided with an internal shoulder 23 which engages with the upper rim of blade assembly securing element 22. When securing element 22 is fully screwed onto the lower cylindrical portion 40 of blender jug 14, transition skirt 19 is secured against the lower portion of the jug. Thus the skirt 19 is removed automatically with the disassembly of the blade assembly so that all parts of all the components are readily accessible for cleaning.

The above describes only some embodiments of the present invention and modifications, obvious to those skilled in the art, can be made thereto without departing from the scope of the present invention.

The invention claimed is:

1. A food blender subassembly; said subassembly comprising a blade assembly securing element for securing a blade assembly in the base of a blender jug; said blade assembly securing element including an internally threaded cylindrical upper portion and a downwardly extending annular rim; an underside of said downwardly extending annular rim provided with a ring of resilient high-friction material; said ring forming a noise suppressing seal between said annular rim and a base module of said blender when in use; said ring further providing a supporting element for said subassembly and said blender jug on said base module for use and when said subassembly and said blender jug are removed from said base module.

2. The subassembly of claim 1 wherein said annular ring is a U-shaped annular ring.

3. The subassembly of claim 1 wherein said internally threaded upper cylindrical portion is adapted for threaded engagement with an external thread at a base portion of said blender jug.

4. The subassembly of claim 3 wherein an outwardly extending flange of a said blade assembly is secured between a flat annular surface of said base portion of said blender jug and an upper surface of an inwardly extending flange portion of said blade assembly securing element.

5. The subassembly of claim 1 wherein a transition skirt extends between a lower portion of said blender jug and a base module of said food blender; said transition skirt retained in contact with said blender jug by said blade assembly securing element when the subassembly is removed from the base module.

6. The subassembly of claim 5 wherein the underside of said resilient high-friction material projects below the underside of said transition skirt.

7. The subassembly of claim 5 wherein said annular ring of resilient high friction material provides a noise suppressing seal between the assembly of said blender jug and blade assembly, and said base module when said blender is assembled and in use.

8. The subassembly of claim 1 wherein said resilient high-friction material is provided with a textured underside; said textured underside arranged to maximise friction between said annular ring and a contacting surface.

9. The subassembly of claim 1 wherein said rotation in said first direction is that direction in which said blender jug must be rotated contra said blade assembly securing element to disengage said threaded engagement between said blender jug and said blade assembly securing element.

10. The subassembly of claim 1 wherein said annular ring of resilient high-friction material comprises a support for said blender jug and blade assembly when said blender jug and blade assembly are removed from said base module of said blender and placed upright on said supporting surface.

* * * * *